United States Patent [19]

Hayashi et al.

[11] Patent Number: 4,589,559

[45] Date of Patent: May 20, 1986

[54] BLOW-MOLDED BOTTLE-SHAPED CONTAINER OF BIAXIALLY ORIENTED POLYETHYLENE TEREPHTHALATE RESIN AND METHOD OF MOLDING THE SAME

[75] Inventors: Yoshiaki Hayashi; Takuzo Takada, both of Tokyo, Japan

[73] Assignee: Yoshino Kogyosho Co., Ltd., Tokyo, Japan

[21] Appl. No.: 772,204

[22] Filed: Sep. 5, 1985

Related U.S. Application Data

[63] Continuation of Ser. No. 593,188, Mar. 27, 1984, abandoned, which is a continuation of Ser. No. 409,176, Aug. 18, 1982, abandoned.

[30] Foreign Application Priority Data

Aug. 20, 1981 [JP] Japan ............................ 56-123127[U]
Aug. 27, 1981 [JP] Japan ................................ 56-134733

[51] Int. Cl.⁴ ...................... B65D 23/00; B65D 1/02; B29C 49/08; B29C 49/64
[52] U.S. Cl. .................................... 215/1 C; 215/31; 264/25; 264/235; 264/346; 264/521; 264/537
[58] Field of Search .................. 215/1 R, 1 C, 31; 264/25, 235, 520, 521, 532, 537, 346

[56] References Cited

U.S. PATENT DOCUMENTS 4,164,298 8/1979 Nishikawa et al. ................. 215/1 C
4,233,022 11/1980 Brady et al. ...................... 215/1 C X
4,288,478 9/1981 Kinoshita et al. ............... 215/1 C X
4,379,099 4/1983 Ota et al. ......................... 264/521 X

FOREIGN PATENT DOCUMENTS 54-68385 6/1979 Japan ................................. 264/532
2015914 9/1979 United Kingdom ................ 264/523
2041286 9/1980 United Kingdom ................ 215/1 C
2066725 7/1981 United Kingdom ................ 264/532

Primary Examiner—William Price
Assistant Examiner—Sue A. Weaver
Attorney, Agent, or Firm—Parkhurst & Oliff

[57] ABSTRACT

A hollow blow-molded bottle-shaped container of a biaxially oriented polyethylene terephthalate which advantageously has a crystallized outer peripheral portion at the neck portion except the boundary between the neck portion and the body portion and non-crystallized inner peripheral portion thereat. This bottle-shaped container is molded by a method of molding the same, which method advantageously has the steps of injection-molding a piece or parison formed at the outer peripheral surface of a neck root part forming portion in a downwardly flared tapered shape, and crystallizing by a heat treatment the outer peripheral surface portion of the neck root part forming portion. Thus, the deterioration in the physical properties of the neck and shoulder portions of the bottle-shaped container thus finally blow-molded can be reduced.

6 Claims, 3 Drawing Figures ion and the shoulder portion of the conventional bottle-shaped container thus blow-molded have such drawbacks and disadvantages that, when high internal pressure is applied to the bottle-shaped container such as in the case that carbonated drink mixed with fruit juice is filled by a hot charging process, the shoulder portion molded without being subjected to sufficient orientation is axially elongated and deformed by the internal pressure.

BLOW-MOLDED BOTTLE-SHAPED CONTAINER OF BIAXIALLY ORIENTED POLYETHYLENE TEREPHTHALATE RESIN AND METHOD OF MOLDING THE SAME

This is a continuation of application Ser. No. 593,188, filed Mar. 27, 1984, now abandoned, which in turn is a continuation of application Ser. No. 409,176, filed Aug. 18, 1982, now abandoned.

BACKGROUND OF THE INVENTION

This invention relates to a hollow blow-molded bottle-shaped container of biaxially oriented polyethylene terephthalate resin and a method of molding a hollow blow-molded bottle-shaped container of a biaxially oriented polyethylene terephthalate resin having a crystalized outer peripheral portion at the neck portion except the boundary between the neck portion and the body portion and non-crystallized inner peripheral portion thereat.

A blow-molded bottle-shaped container of a biaxially oriented polyethylene terephthalate resin, hereinafter referred to as "a PET" has a wide range of applications because of its excellent physical properties and characteristics.

Some of the excellent physical properties of a bottle-shaped container made of PET can be performed after the bottle-shaped container has been biaxially oriented and blow-molded. The bottle-shaped container of the PET has heretofore been produced due to the physical properties of the PET by the steps of injection-molding a piece or parison as a primary or prefabricated molded piece and then biaxially orienting the primary piece or parison by the so-called injection blow-molding method. Thus, the neck portion of the bottle-shaped container used as a mounting portion for the blowing mold has not entirely been oriented but been molded from the primary piece or parison to the hollow blow-molded bottle-shaped container. In this manner, the shoulder portion continued to the neck portion of the bottle-shaped container has not thus been sufficiently oriented in the course of the injection blow-molding method but has been blow-molded to the final bottle shape. Accordingly, the neck portion and the shoulder portion of the bottle-shaped container do not exhibit the excellent physical properties of the PET prepared by being subjected to the biaxially blow-molded method.

The drawbacks and disadvantages of the bottle-shaped container of the final shape thus blow-molded at the neck portion and shoulder portions which have not been subjected to or sufficiently subjected to orientation are, for example, a crazing which occurs due to the impregnation of alcohol, various deformations and strains including elongation due to lack of sufficient hardness of the bottle-shaped container, and a low thermal resistance due to the occurrence of thermal deformation when the bottle is filled with hot liquid for the purpose of sterilization. More concretely, the neck port

SUMMARY OF THE INVENTION

Accordingly, an object of the present invention is to provide a hollow blow-molded bottle-shaped container of biaxially oriented polyethylene terephthalate resin which can eliminate all the aforementioned drawbacks and disadvantages of the conventional bottle-shaped container and which has less deterioration in the physical properties of the neck portion and the shoulder portion including the neck root part.

Another object of the present invention is to provide a method of molding a hollow blow-molded bottle-shaped container of a biaxially oriented polyethylene terephthalate resin which can eliminate all the aforementioned drawbacks and disadvantages of the conventional method of molding the bottle-shaped container of biaxially oriented polyethylene terephthalate resin and which can impart the same effects of orientation in the blow-molding as the body portion of the bottle-shaped container to the shoulder portion of the bottle-shaped container, thereby eliminating crazing due to the impregnation of alcohol in the neck portion of the bottle-shaped container.

A further object of the present invention is to provide a method of molding a hollow blow-molded bottle-shaped container of biaxially oriented polyethylene terephthalate resin which can impart sufficient hardness to the bottle-shaped container thereby eliminating permanent deformation of the neck portion due to the clamping of a cap at the neck portion.

Still another object of the present invention is to provide a method of molding a hollow blow-molded bottle-shaped container of a biaxially oriented polyethylene terephthalate resin which can improve the heat resistance of the bottle-shaped container thus molded.

Still another object of the invention is to provide a method of molding a hollow blow-molded bottle-shaped container of a biaxially oriented polyethylene terephthalate resin which can eliminate various deformations such as the elongation of the shoulder portion by high internal pressure acting to the interior of the bottle-shaped container.

According to a preferred aspect of the present invention, there is provided a method of molding a hollow blow-molded bottle-shaped container of a biaxially oriented polyethylene terephthalate resin which comprises the steps of forming the outer peripheral surface of the neck root part forming portion disposed directly under the neck portion forming portion of a prefabricated piece or parison injection-molded in a downwardly flared tapered shape in such a manner that the thickness of the body forming portion is larger than that of the neck root forming portion of the piece or parison prior to the biaxial-orientation blow-molding step, heat treating the outer peripheral surface of the neck root part forming portion and the neck portion forming portion of the piece or parison to crystallize the same, and biaxial-orientation blow-molding the piece or parison into a bottle-shaped container of a biaxially oriented polyethylene terephthalate resin.

BRIEF DESCRIPTION OF THE DRAWINGS

The above and other related objects and features of the invention will be apparent from reading of the following description of the disclosure found in the accompanying drawings and the novelty thereof pointed out in the appended claims.

DESCRIPTION OF THE PREFERRED EMBODIMENTS

The present invention will now be described in more detail with reference to the accompanying drawings.

Figure 1:
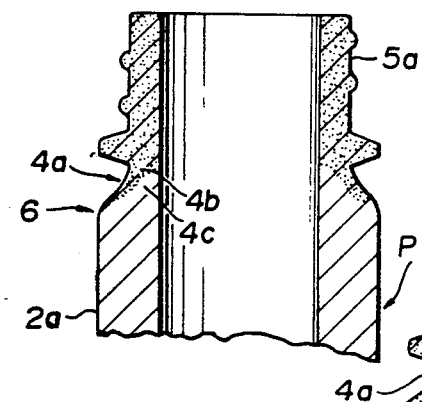
FIG. 1 is a partially longitudinal sectional view of an injection-molded piece or parison before being biaxially oriented according to the present invention.

In the present invention a piece or parison P injection-molded as a parison which is then molded into a bottle-shaped container 1. The piece or parison P to be used in the method of the present invention is formed, as shown in FIG. 1, in a downwardly flared tapered shape at the neck root part forming portion 4a disposed directly under a neck portion forming portion 5a in such a structure that the thickness of the neck root part forming portion 4a is sufficiently smaller than that of the body portion forming portion 2a.

The outer peripheral surface of the neck root part forming portion 4a thus formed in a downwardly flared tapered shape is formed in the same shape as the outer peripheral surface of the portion of the bottle-shaped container 1 to be produced by biaxial-orientation blow-molding the piece or parison P and hence the neck root part 4 of the bottle-shaped container 1.

According to the method of the present invention, the piece or parison P thus formed in such a structure described above is heat treated at the entire area of the neck forming portion 5a and the outer peripheral surface of the neck root part forming portion 4a to be thus crystallized prior to the biaxial-orientation blow-molding of the piece or parison P.

It should be noted in this case that the outer peripheral surface of the neck root part forming portion 4a becoming a curved portion to be crystallized may not reach a boundary portion 6 between the outer peripheral surface of the neck root part forming portion 4a and the body portion forming portion 2a. This configuration is used if the boundary portion 6 is not be oriented and deformed.

After the entire area of the neck portion forming portion 5a and the outer peripheral surface 4b of the neck root part forming portion 4a are crystallized in this manner, the piece or parison P is heated to a temperature allowing an orientation effect for the piece or parison P, which is then mounted via the neck portion forming portion 5a in a blowing mold, and is biaxial-orientation blow-molded into a bottle-shaped container 1.

The biaxial-orientation blow-molding of the piece or parison P into a bottle-shaped container 1 is performed in the same manner as the conventional blow-molding, but the deformed states of the respective portions of the piece or parison P, particularly the neck root part 4 and the biaxial-orientation blow-molding are largely different from those carried out according to the conventional blow-molding by the process that the outer peripheral surface of the neck root part forming portion 4a is crystallized and the thickness of the neck root part forming portion 4a is smaller than that of the body portion forming portion 2a.

More particularly, the orienting deformation of the piece or parison P is concentrated to the thinner portion of the piece or parison P to cause the thinner portion to be deformed to a predetermined elongation quantity much earlier. Therefore, when the piece or parison P is blow-molded by biaxial orientation into a bottle-shaped container 1, the elongation deformation is concentrated at the neck root part forming portion 4a which is thus thinly formed at the initial time of the orientation blow-molding.

However, since the outer peripheral surface of the neck root part forming portion 4a of the piece or parison P has already been crystallized, only the inside portion 4c of the neck root part forming portion 4a which has not crystallized is orientation-deformed upon orientation-deforming of the body portion forming portion 2a in such a state to be moved to the body portion forming portion 2a side, thereby forming substantially the shoulder portion 3 of the bottle-shaped container 1.

When the neck root part forming portion 4a of the piece or parison P is orientation-deformed in the blowing-mold, only the outer peripheral surface of the neck portion forming portion 5a and the outer peripheral surface of the neck root part forming portion 4a, i.e., the portions already crystallized are contacted with the blowing-mold but the other portions are not contacted with the blowing-mold. Therefore, the cooling effect from the blowing-mold at the initial time of the orientation-deforming does not substantially affect the uncrystallized portions and hence the inner peripheral uncrystallized surface of the neck root part forming portion of the neck forming portion, are thereby smoothly formed by the orientation deformation of the uncrystallized portion neck root part forming portion.

Figure 2:
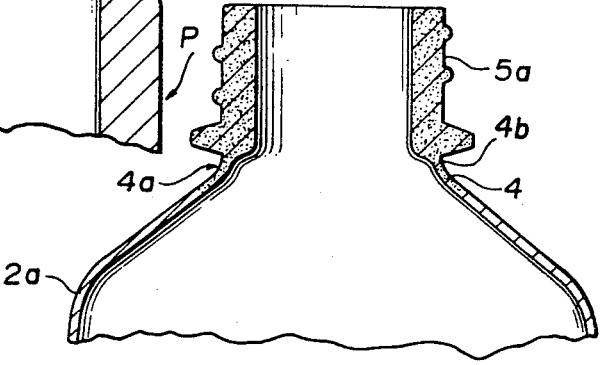
FIG. 2 is a partially longitudinal sectional view of a bottle-shaped container blow-molded according to the method of the present invention.

In this manner, the neck root part forming portion 4a of the neck portion forming portion 5a of the piece or parison P can be sufficiently orientation-deformed except the outer peripheral surface 4b. Accordingly, as evident from FIG. 2, the neck root part 4 is formed substantially at the outer crystallized peripheral surface 4b of the neck part forming portion 4a in the orientation blow-molding, the shoulder portion 3. Integral with the neck root part 4 of the neck portion 5 is molded at the outer peripheral crystallized surface of the neck root forming portion 4a, and the shoulder portion 3 integrally continued to the neck root part 4 is blow-molded in such a manner that the inside uncrystallized portion 4c of the neck root forming portion 4a is orientation blow-molded. Therefore, the shoulder portion 3 integral with the neck root part 4 can be sufficiently oriented and can be formed in the thickness equivalent to the body portion 2 of the bottle-shaped container 1.

Therefore, the bottle-shaped container 1 thus biaxial-orientation blow-molded is blow-molded by crystallizing the neck portion 5 forming a part of the bottle-shaped container 1 not entirely oriented from the piece or parison P and the neck root part 4 forming a part of the bottle-shaped container 1 substantially not oriented nor deformed, and the shoulder portion 3 not heretofore sufficiently oriented and blow-molded can also be sufficiently orientation-deformed.

Figure 3:
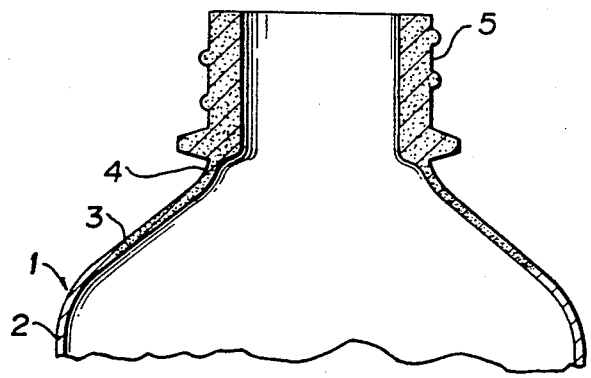
FIG. 3 is a partially longitudinal sectional view of a bottle-shaped container in which the portion from the neck root part to the intermediate part of the shoulder portion is crystallized according to the method of the present invention.

FIG. 3 shows a bottle-shaped container in which the portion from the neck root part 4 to the intermediate part of the shoulder portion 3 is substantially crystallized according to the present invention. In order to blow-mold this bottle-shaped container according to the method of the present invention, the crystallization step performed at the neck root part forming portion 4a of the piece or parison P extends further to the boundary portion 6 as compared from the state shown in FIG. 1.

It should be appreciated from the foregoing description that since the method of molding the hollow-blow-molded bottle-shaped container of the present invention previously crystallizes the neck portion 5 blow-molded into final shape without substantially entirely orientation-deformed and the neck root part 4 blow-molded into final shape without substantially orientation-deformed, thereby sufficiently orientation-deforming the shoulder portion 3 not sufficiently blow-molded to the final shape without heretofore sufficiently orientation-deformed, it can impart the effect by the orientation equivalent to the body portion 2 to the shoulder portion 3, can thus prevent the crazing caused by alcohol at the neck portion 5, can provide sufficient hardness to the bottle-shaped container, thereby preventing permanent deformation upon clamping of a cap at the neck portion, can improve the heat resistance of the bottle-shaped container and can also prevent the various deformations such as the elongation of the shoulder portion 3 due to the high internal pressure acting on the interior of the bottle-shaped container thus blow-molded.

What is claimed is:

1. A method of producing a hollow container of polyethylene terephthalate having an upper neck portion, a middle shoulder portion and a lower body portion, comprising:
    molding a preform having a neck portion, a neck root portion and a body portion,
    crystallizing said preform through the entire thickness of said neck portion and partially through the thickness of said neck root portion, and refraining from crystallizing said body portion, and
    blow-molding said preform to form a container in which the neck portion is crystallized through its entire thickness, an upper portion of said shoulder portion is crystallized through substantially its entire thickness while a lower portion of said shoulder portion is uncrystallized and biaxially oriented, and said body portion is uncrystallized and biaxially oriented, by stretching the preform suffiently to cause the uncrystallized thickness of said neck root portion to move substantially entirely laterally beyond the crystallized thickness of said neck root portion to form said uncrystallized lower shoulder portion.

2. A method in accordance with claim 1, wherein said body portion is thicker than said neck root portion and after blow-molding said preform to form a container, said shoulder portion is equal in thickness to said body portion.

3. A hollow blow-molded container of polyethylene terephthalate resin produced in accordance with the method of claim 1.

4. A method of producing a hollow container of polyethylene terephthalate according to claim 1, wherein only crystallized portions of said preform are contacted with a blow-molding mold prior to said blow-molding step.

5. A hollow blow-molded container of polyethylene terephthalate resin, comprising:
    a crystallized neck portion,
    a biaxially oriented and uncrystallized body portion, and
    a shoulder portion between said neck and body portions having an upper portion which is crystallized through substantially its entire thickness and a lower portion which is biaxially oriented by blowing an uncrystallized inner layer of a neck root portion of a preform for said container substantially entirely past a crystallized outer layer of the neck root portion.

6. A bottle in accordance with claim 5, wherein said shoulder portion is equal in thickness to said body portion.

* * * * *